United States Patent [19]

Waite et al.

[11] Patent Number: 5,594,230
[45] Date of Patent: Jan. 14, 1997

[54] ANALYZER FOR BAR CODE READERS AND DECODERS

[75] Inventors: James E. Waite; Roger L. Wolf, both of Cedar Rapids, Iowa

[73] Assignee: Norand Corporation, Cedar Rapids, Iowa

[21] Appl. No.: 19,459

[22] Filed: Feb. 18, 1993

[51] Int. Cl.⁶ .................................................. G06K 7/10
[52] U.S. Cl. ............................................. 235/462; 235/472
[58] Field of Search ..................................... 235/462, 472

[56] References Cited

U.S. PATENT DOCUMENTS

| | | | |
|---|---|---|---|
| 4,877,949 | 10/1989 | Danielson | 235/462 |
| 5,200,597 | 4/1993 | Eastman | 235/472 |
| 5,218,170 | 6/1993 | Hardesty et al. | 235/462 |
| 5,227,614 | 7/1993 | Danielson | 235/472 |
| 5,247,170 | 9/1993 | Cardew | 235/472 |
| 5,250,791 | 10/1993 | Heiman et al. | 235/472 |
| 5,260,553 | 11/1993 | Rockstein | 235/472 |

*Primary Examiner*—Harold Pitts
*Attorney, Agent, or Firm*—Henderson & Sturm

[57] ABSTRACT

A bar code reader/decoder analyzer method and system for testing the quality characteristics of bar code readers and bar code decoders. An analyzer unit is interface with and controlled by host computer which can either be located within the analyzer unit or housed separately. A bar code reader which is to be tested is connected to the analyzer unit and a series or test patterns is scanned. The digitized information from the scanner is converted by the analyzer into quantifiable data and is transmitted to the host computer where it is stored and analyzed. A bar code decoder is connected to the analyzer unit and is sent a series of digitized signals representing a series of scans by a bar code reader of similar type. The decoder decodes the information and transmits the data back to the host computer where the data can be analyzed.

17 Claims, 16 Drawing Sheets

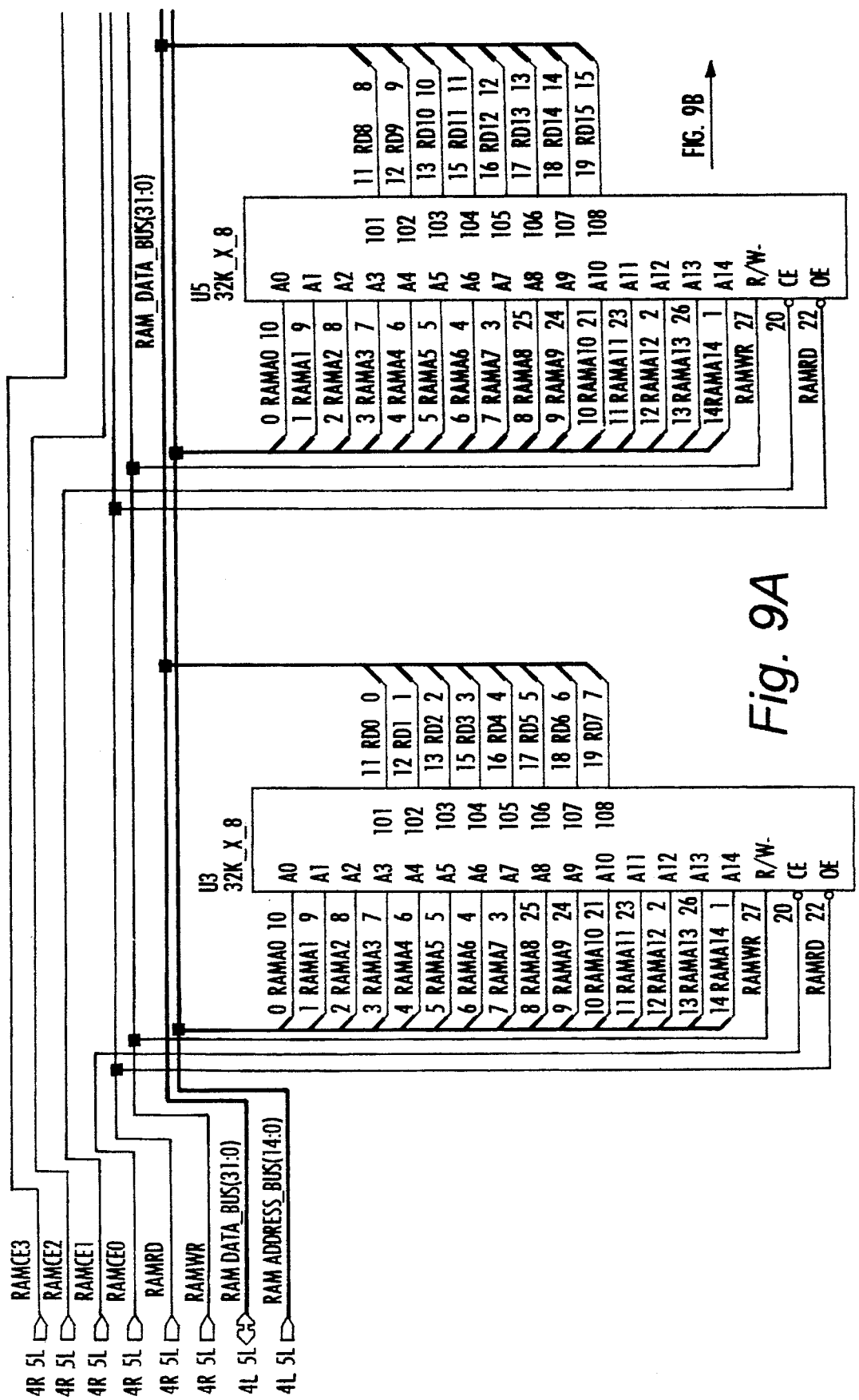

ANALYZER FOR BAR CODE READERS AND DECODERS

AUTHORIZATION PURSUANT TO 37 CFR 1.71 (d) (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to bar code readers and decoders used bar code scanning systems and more particularly to a method and system for analyzing the performance characteristics of the bar code readers and decoders.

DISCLOSURE OF THE INVENTION

This invention relates generally to an analyzer apparatus constructed for selectively capturing or generating bar code data streams and to systems and methods utilizing such analyzer apparatus for the evaluation and testing of bar code readers and decoders. The system may be used to capture and analyze the quality characteristics of a bar code reader stream from a bar code reader under test, for example, using a set of bar code patterns selected for test purposes. The system may also be utilized to generate a range of test bar code signals suitable for evaluation of the decoding quality characteristics of various types of decoders. The analyzer apparatus operates to convert bar code data streams to storable bar code data that can be measured numerically, and the apparatus is also operable to repeatedly generate a precise set of bar code signals, thus making possible automated, quantifiable characteristic evaluation of bar code readers and decoding devices.

A preferred analyzer apparatus comprises a single analyzer unit capable of selective operation in a capture mode and an emulate mode. In the capture mode, the unit acts as a bar code data stream recorder. In this mode, the unit is connected with a bar code reader of any desired type such as a wand reader, an image reader such as one of the CCD type, or a deflected beam laser scanner. In the presently preferred arrangement, a host computer of a generally available type such as a personal computer is programmed to form part of the system. Since such computers are generally available to potential users of the present invention, significant economies can be achieved by minimizing the cost and complexity of the analyzer unit itself.

In this example, the analyzer in the capture mode may receive the digitized bar code signals from a bar code reader under test as the bar code reader scans a set of test bar code patterns. The analyzer unit converts the bar code signals to a numeric representation and uploads the data to the host computer. There the data stream may be analyzed for quality characteristics and stored for future reference. The computer can be programmed to analyze the data stream in many ways. Capturing the data stream in this matter allows for a controlled, quantitative analysis of the bar code reader, rather than merely connecting the reader to a decoding device and determining if the reader can decode labels on a go, no-go basis.

For this example, in the emulate mode, the host computer supplies to the analyzer unit sets of bar code data suitable for testing the decoding quality characteristics of various decoding devices. The analyzer unit transmits digitized bar code signals in accordance with the sets of bar code data to the decoding device so as to exactly simulate the output of a desired type of bar code reader. By being able to send the same exact bar code signals to several decoding devices, a comparison can be made. The host computer can be programmed to make specific types of transformations to the bar code data, and in each case, the output from the decoder being tested can be returned to the host computer for comparison and evaluation.

The evaluation of the decoding devices can be automated by suitable programming of the host computer so that the system allows for an automated and very repeatable test of various decoding devices. Design changes can be made to the decoding device and changes in decoding quality can be readily evaluated. The accurate repeatability of the generated bar code signals greatly facilitates comparison and is in contrast to the variable nature of bar code signals which may result when a human operator attempts to test decoding devices using the direct output of a manually operated bar code reader. Additionally, the system is readily and easily modified to accommodate future bar code devices such as two dimensional bar code readers that may present data streams in a different fashion by modifying the interface between the bar code reader or decoder and the computer and by modifying the programming of the computer.

An object of the present invention is to provide an improved system for analyzing bar code readers and decoders.

Another object of the present invention is to provide an improved method for analyzing bar code readers and decoders.

A further object of the present invention is to provide an economical bar code reader/decoder analyzer by utilizing a host computer such as a small personal computer.

Another object of the present invention is to provide a bar code reader/decoder analyzer capable of receiving, storing and analyzing the digitized output of various bar code readers.

Still another object of the present invention is to provide a bar code reader/decoder analyzer capable of repeatedly sending an identical set of bar code signals to one or more bar code decoders and recording the output of the decoders.

Other objects, advantages, and novel features of the present invention will become apparent from the following detailed description of the invention when considered in conjunction with the accompanying drawings.

BRIEF DESCRIPTION OF THE DRAWINGS

FIG. 9A–B is a schematic diagram showing one embodiment of the bar code emulator circuitry of the bar code reader/decoder analyzer shown in FIG. 4.

BEST MODES FOR CARRYING OUT THE INVENTION

Figure 1:
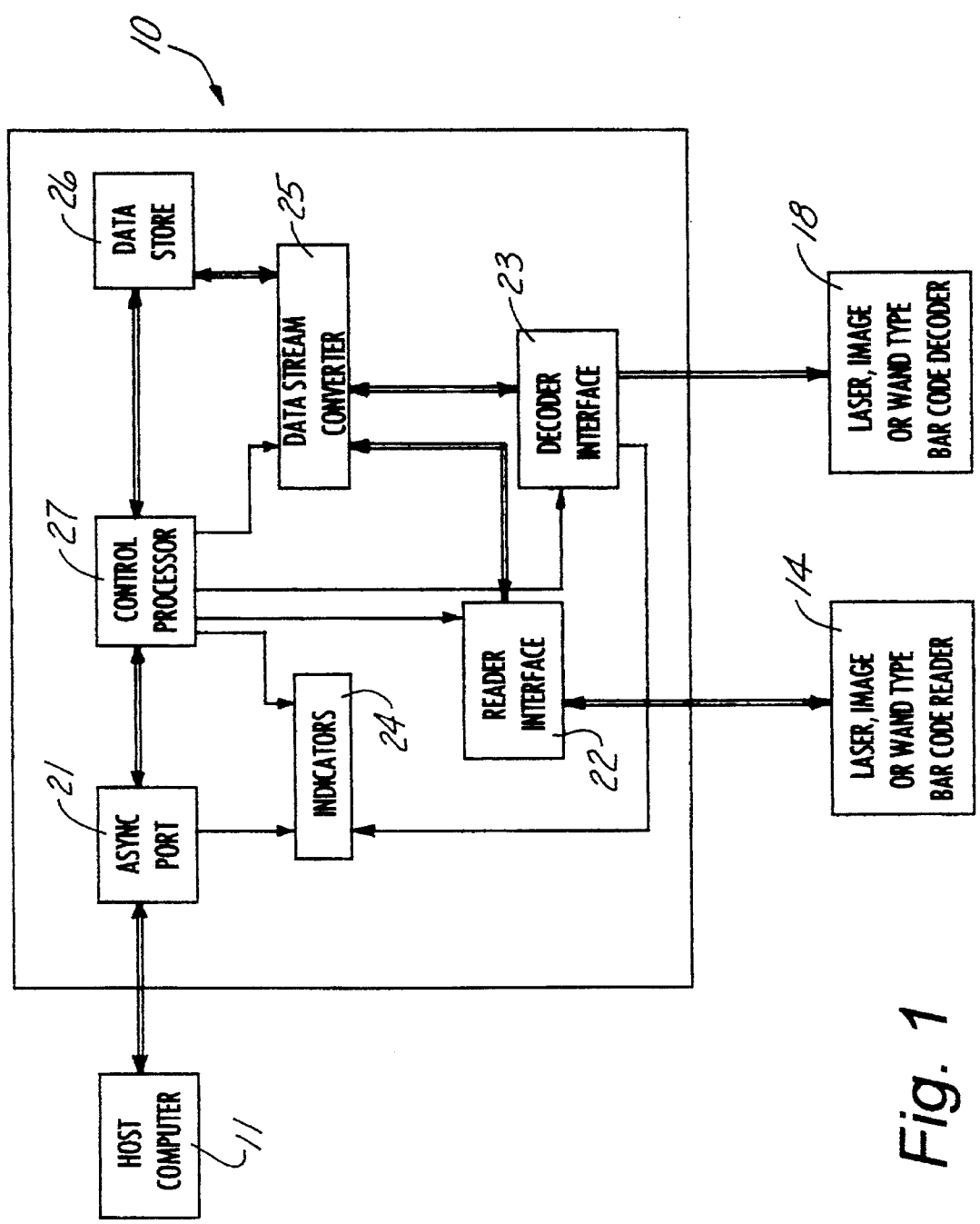
FIG. 1 is a block diagram of a bar code reader/decoder analyzer system built in accordance with the present invention.

Referring now to the drawings wherein like reference numerals designate identical or corresponding parts throughout the several views, FIG. 1 shows a bar code reader/decoder analyzer (10) interfaced with and controlled by a host computer (11). The analyzer (10) also has an reader interface (22) for interfacing with a bar code reader (14) of any desired type such as a commercially available deflected laser beam scanner, a commercially available image scanner such as one of the CCD type, or a wand-type bar code reader wherein the hand held reader device is manually moved across a bar code pattern. The analyzer (10) also has a decoder interface (23) for interfacing with a bar code decoder (18) of any desired type of decoding device such as a decoder for the various types of laser, image and wand-type bar code readers.

In a preferred embodiment, the host computer (11) is housed separately from the analyzer (10), and the analyzer (10) is interfaced by way of an asynchronous port (21) with any commercially available computer such as a personal computer which may be readily available to the users of the bar code reader/decoder analyzer (10). Examples of suitable, presently available computers would include the range from IBM XT class computers running DOS 3.x with a CGA type display to a computer using a 486/33 processor, a SVGA type display, eight megabytes of RAM, running windows 3.x on DOS 5.0. Thus, with the provision of a separate analyzer (10), with a desired interface such as an asynchronous port (21) and the reader interface (22) and decoder interface (23), the analyzer (10) may be made extremely economical and readily adaptable to different analysis systems. The asynchronous port (21), or potentially one of many other types of interfaces, may be suited for connection with typical commercially available computers such as those found in service centers for bar code equipment, or such as those found in engineering departments concerned with the selection of optimum equipment for reading given types of bar code patterns and for improving bar code readers and decoders.

In the preferred embodiment, software may be provided for the host computer (11) for interfacing the computer with the analyzer (10) and providing for the transmission of commands as data to the analyzer (10). The software also can control and serve as the interface between the system and the operator of a given test procedure. It is contemplated that the host computer (11) will act as a controller for the analyzer (10), selecting between a capture mode and an emulator mode, and for example in the capture mode, storing the count values representing the bar code data from the bar code reader (14) under test, and in emulator mode, generating the successive count values representing a bar code signal to be supplied to the analyzer unit (10) and ultimately to a decoder (18), and serving to manipulate and modify the count values to be transmitted to the analyzer (10) so as to provide a desired set of test bar code signals for the decoder (18). The host computer may also store a program module which is to be downloaded into the analyzer (10) so as to control its operation.

Referring still to FIG. 1, the analyzer (10) may include an asynchronous port (21) for communication with the host computer (11), a reader interface (22) for communication with a bar code reader (14) to be tested, and a decoder interface (23) for communicating with a bar code decoder (18) to be tested. Indicators (24) may be included to indicate the operation status of the analyzer (10).

In capture mode, a data stream converter (25) receives digitized bar code signal from the bar code reader (14) via the reader interface (22) and generates corresponding numerical data for transmission to a data store or buffer (26). The process is controlled by the control processor (27). By way of example, the digitized signals may be converted and stored as time interval measurements representing the time intervals between transitions in a digitized bar code signal in a manner analogous to the functioning of a smart scanner wand such as illustrated in U.S. Pat. No. 4,902,883, which is hereby incorporated by reference. Thus, the suitably scaled time interval measurement data store in data store (26) may be formatted and transmitted to the asynchronous port (21) in a conventional manner so that the host computer (11) can store the time measurement data based on an extensive set of test operations of a bar code reader (14).

Figure 3:
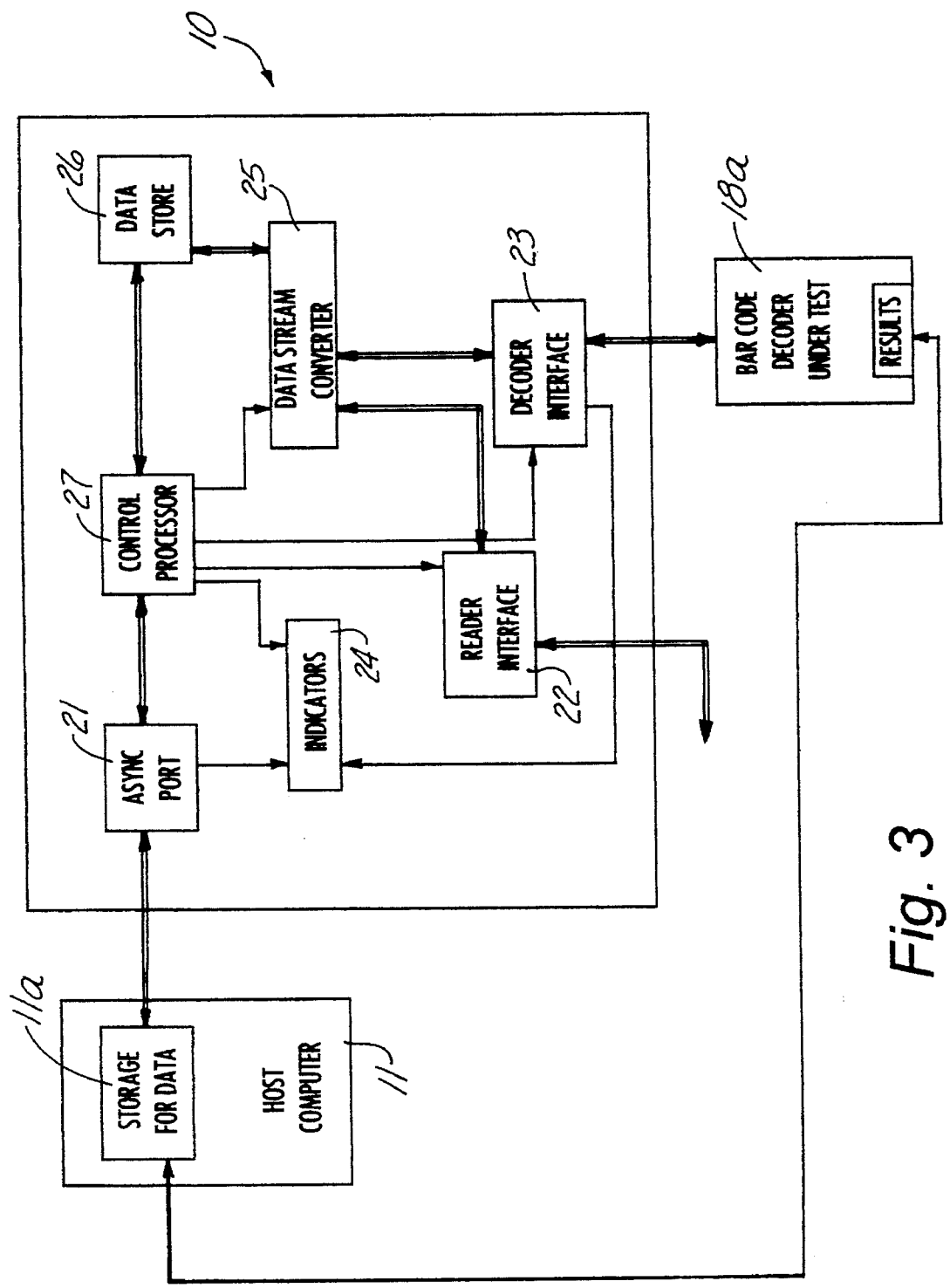
FIG. 3 is a block diagram demonstrating the emulate mode of the bar code reader/decoder analyzer system shown in FIG. 1.
Figure 4:
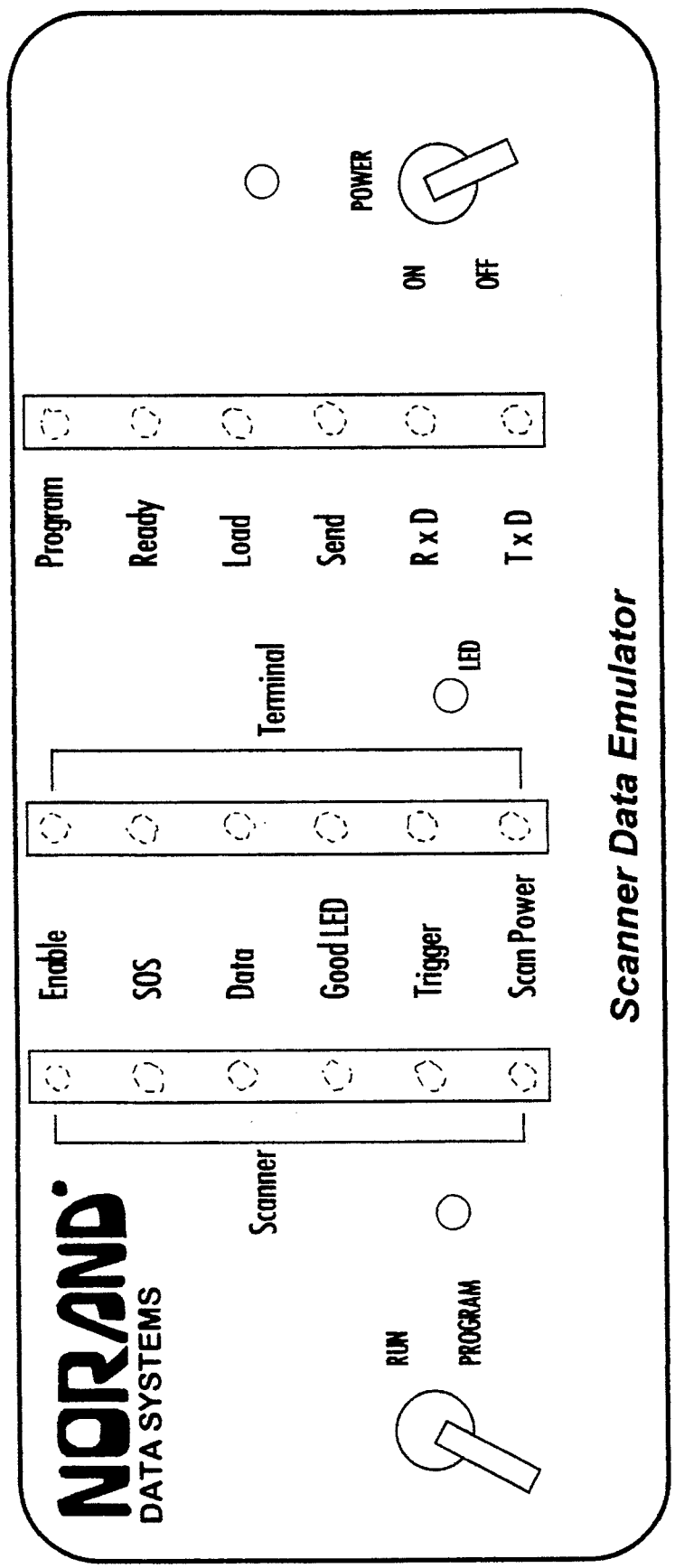
FIG. 4 is a front elevational view of the bar code reader/decoder analyzer shown in FIG. 1.
Figure 5:
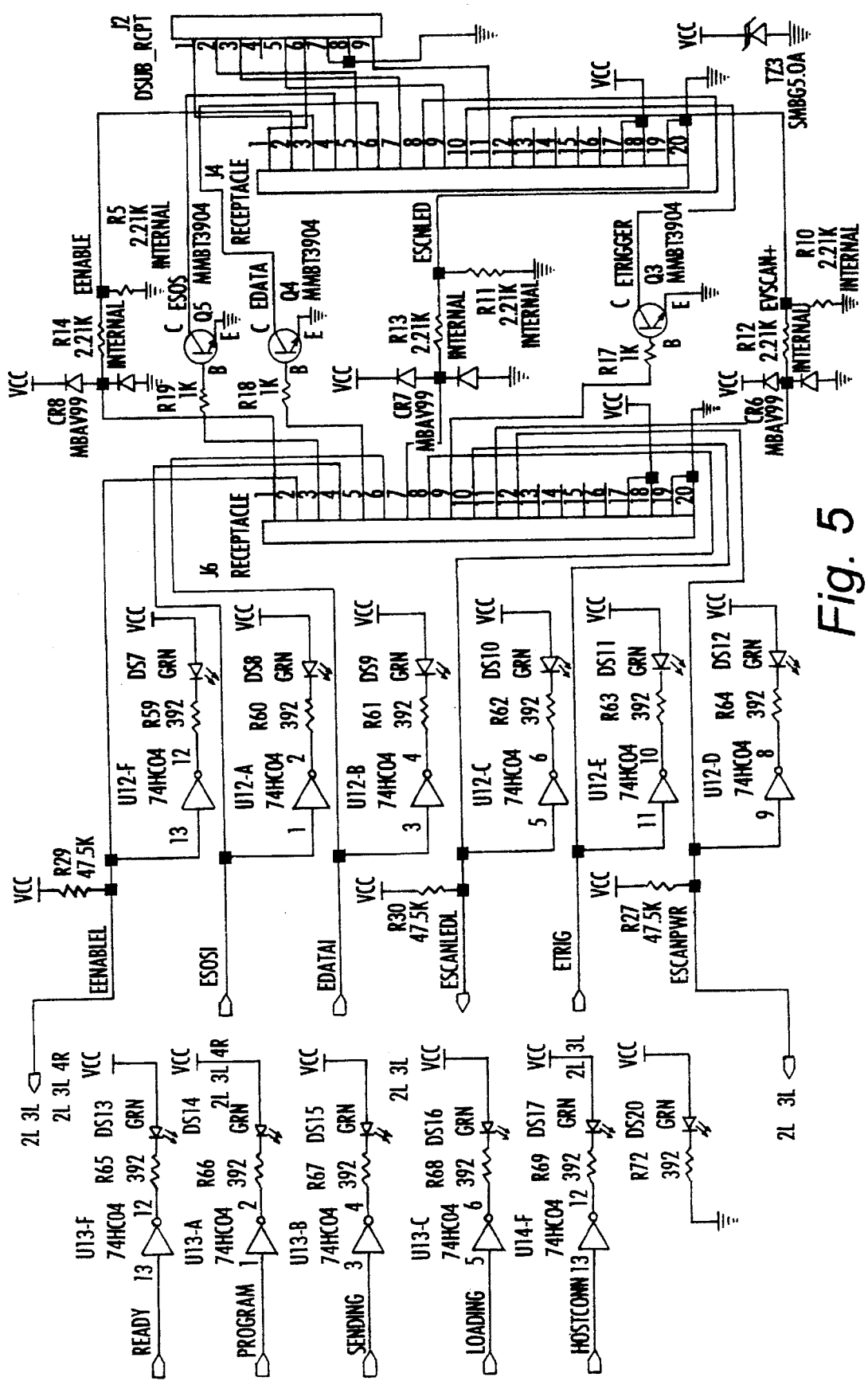
FIG. 5 is a schematic diagram showing one embodiment of the emulator circuitry of the bar code reader/decoder analyzer shown in FIG. 4.
Figure 6:
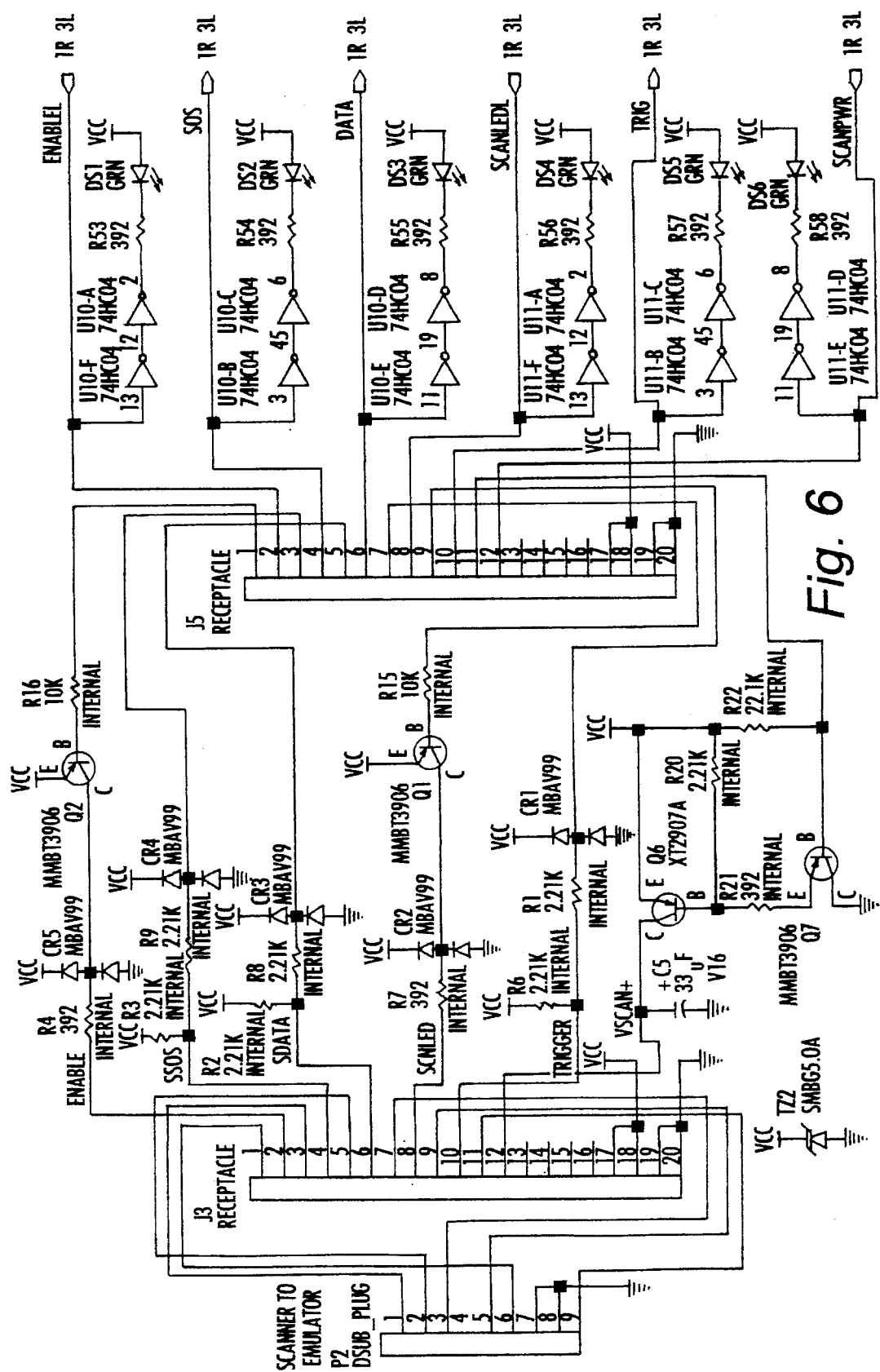
FIG. 6 is a schematic diagram showing one embodiment of a section of the CPU circuitry of the bar code reader/decoder analyzer shown in FIG. 4.
Figure 7A:
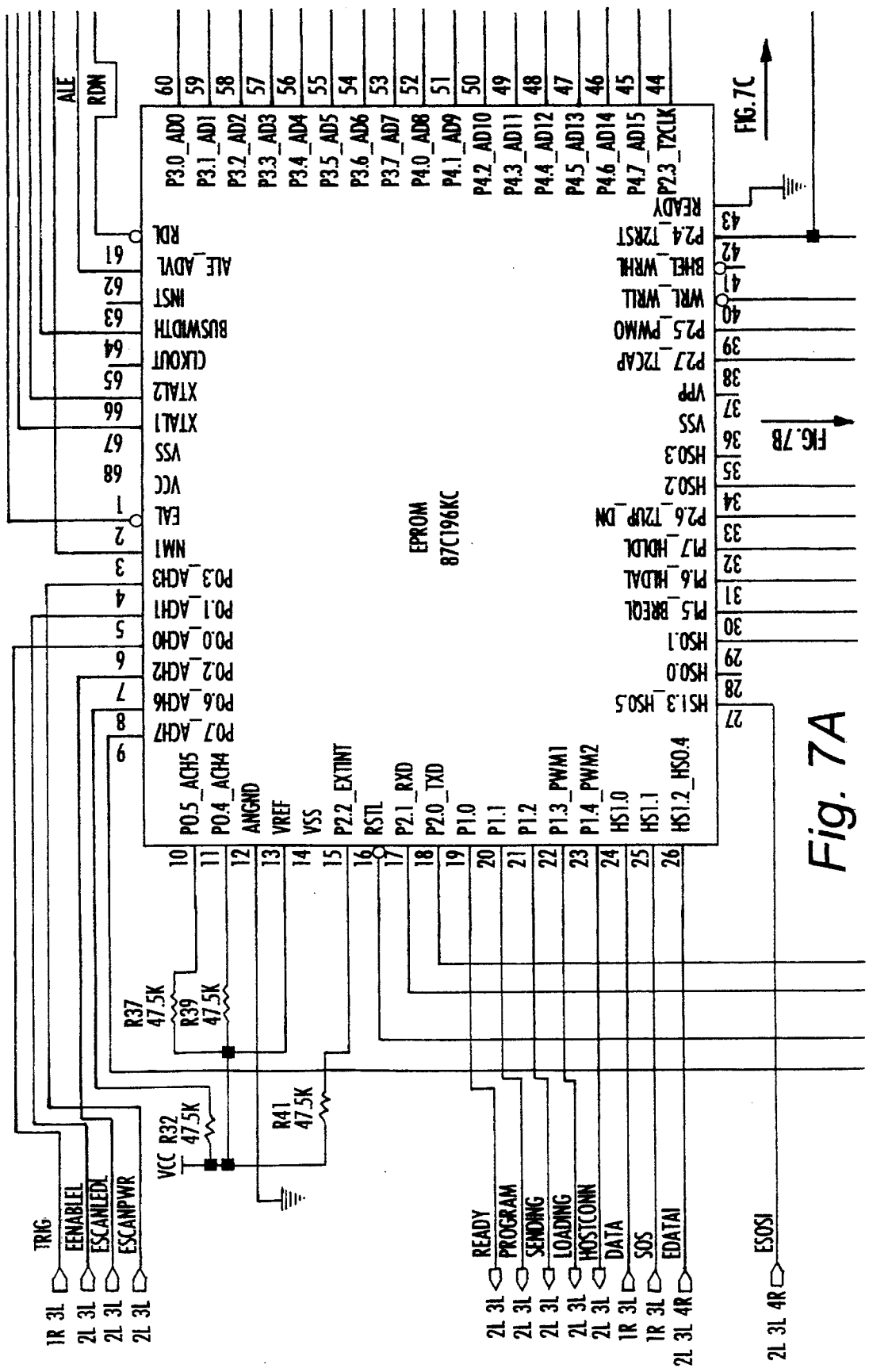
FIG. 7A–D is a schematic diagram showing one embodiment of another section of the CPU circuitry of the bar code reader/decoder analyzer shown in FIG. 4.
Figure 7B:
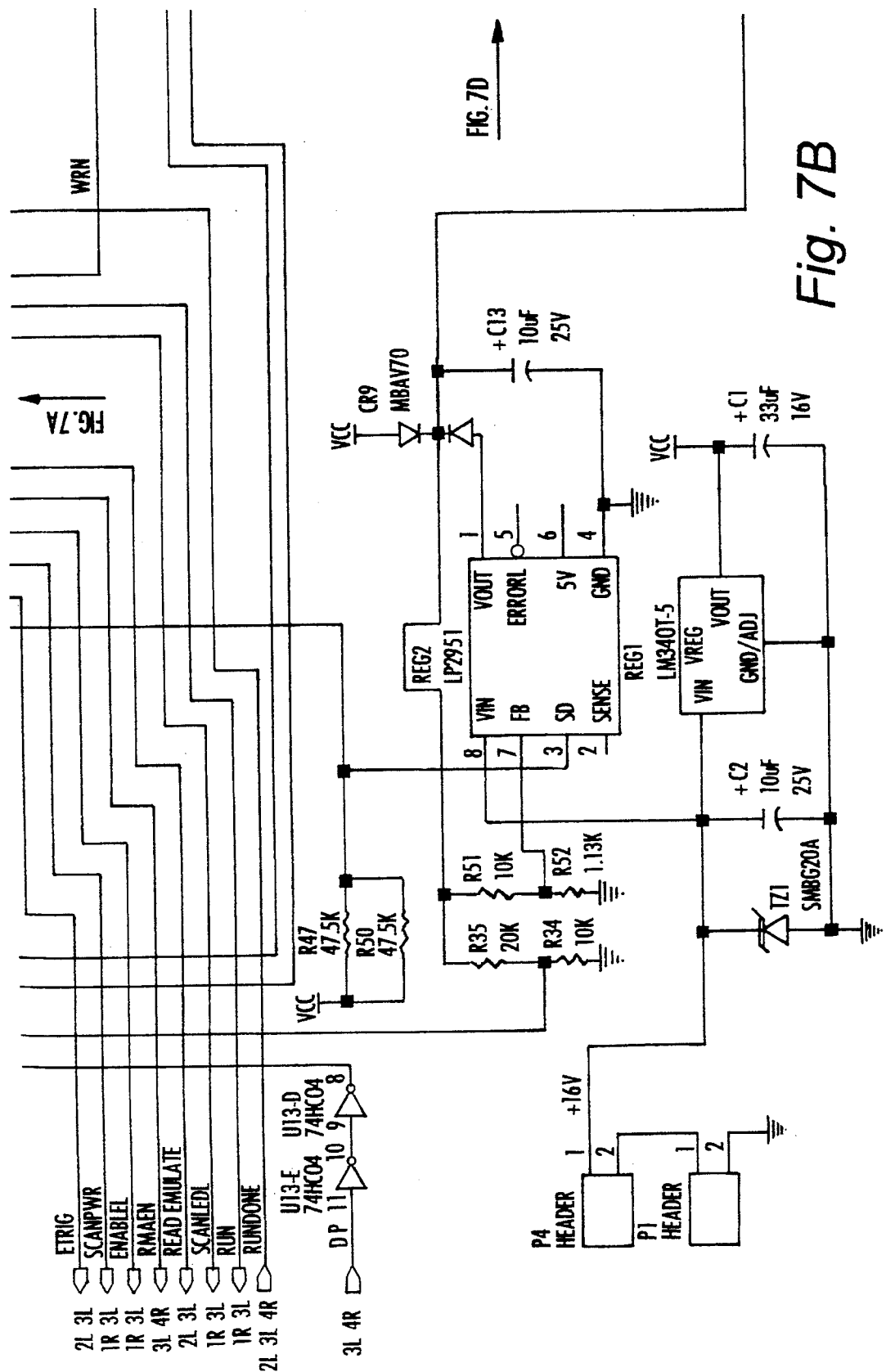
Figure 7C:
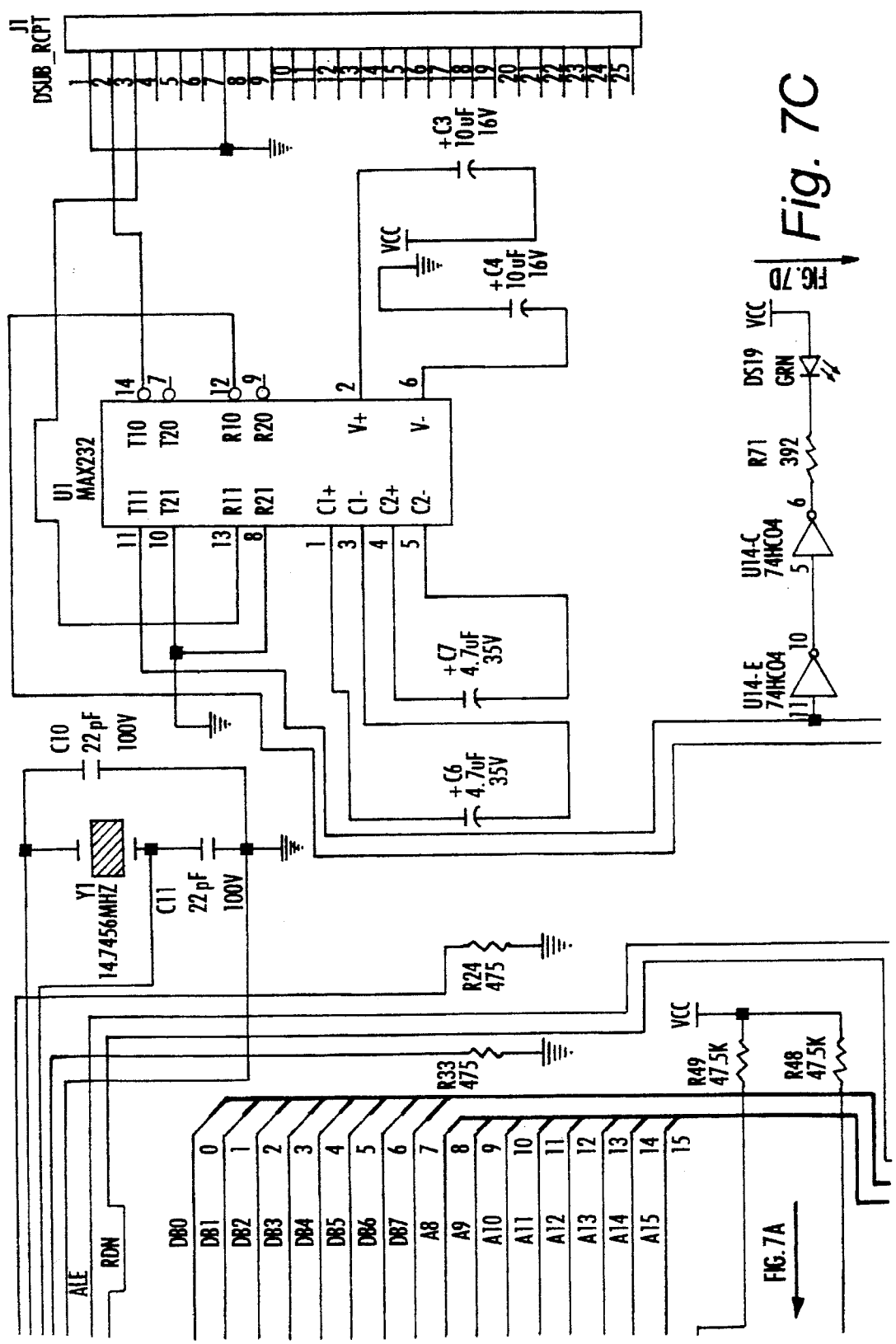
Figure 7D:
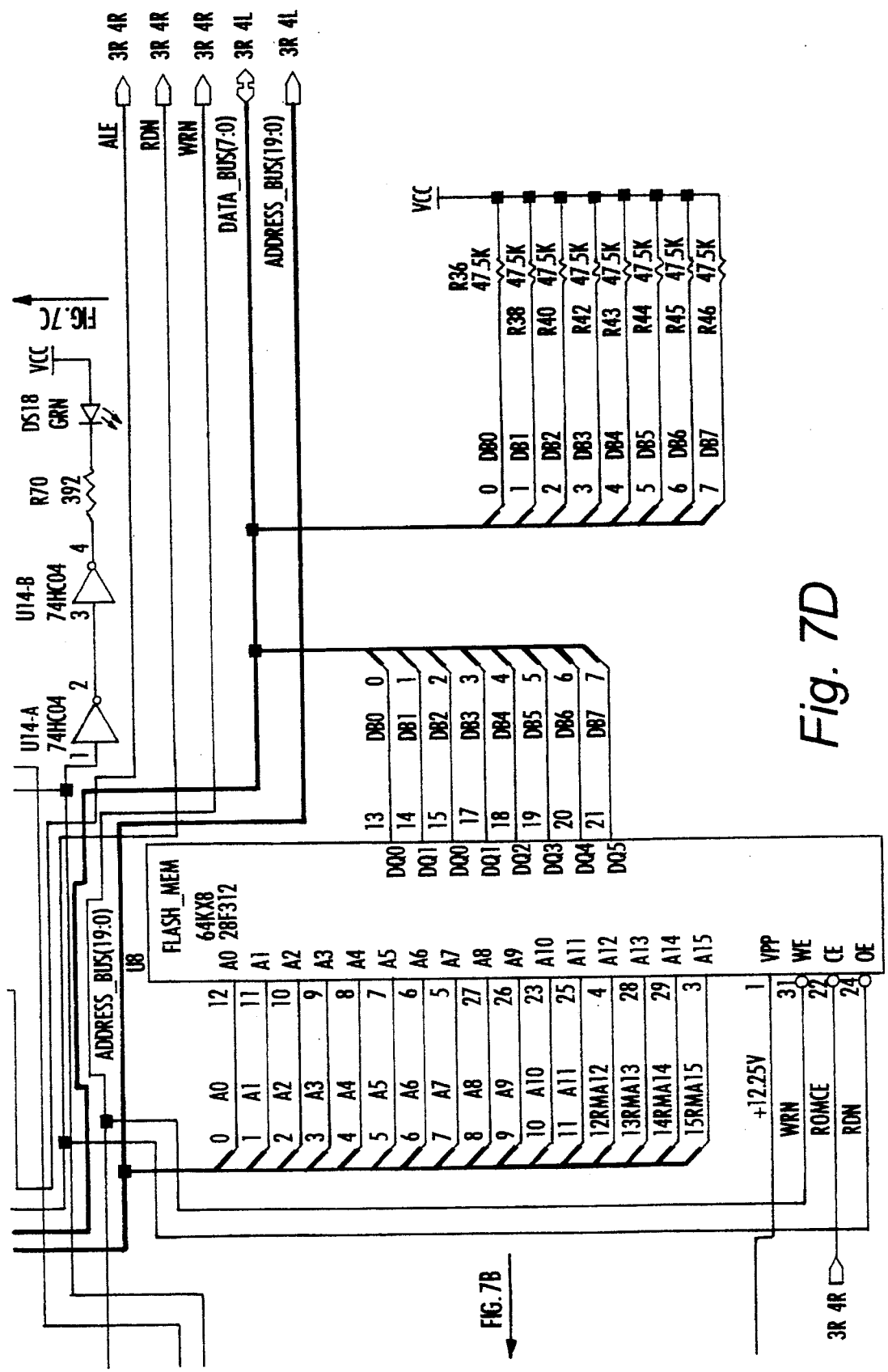
Figure 8A:
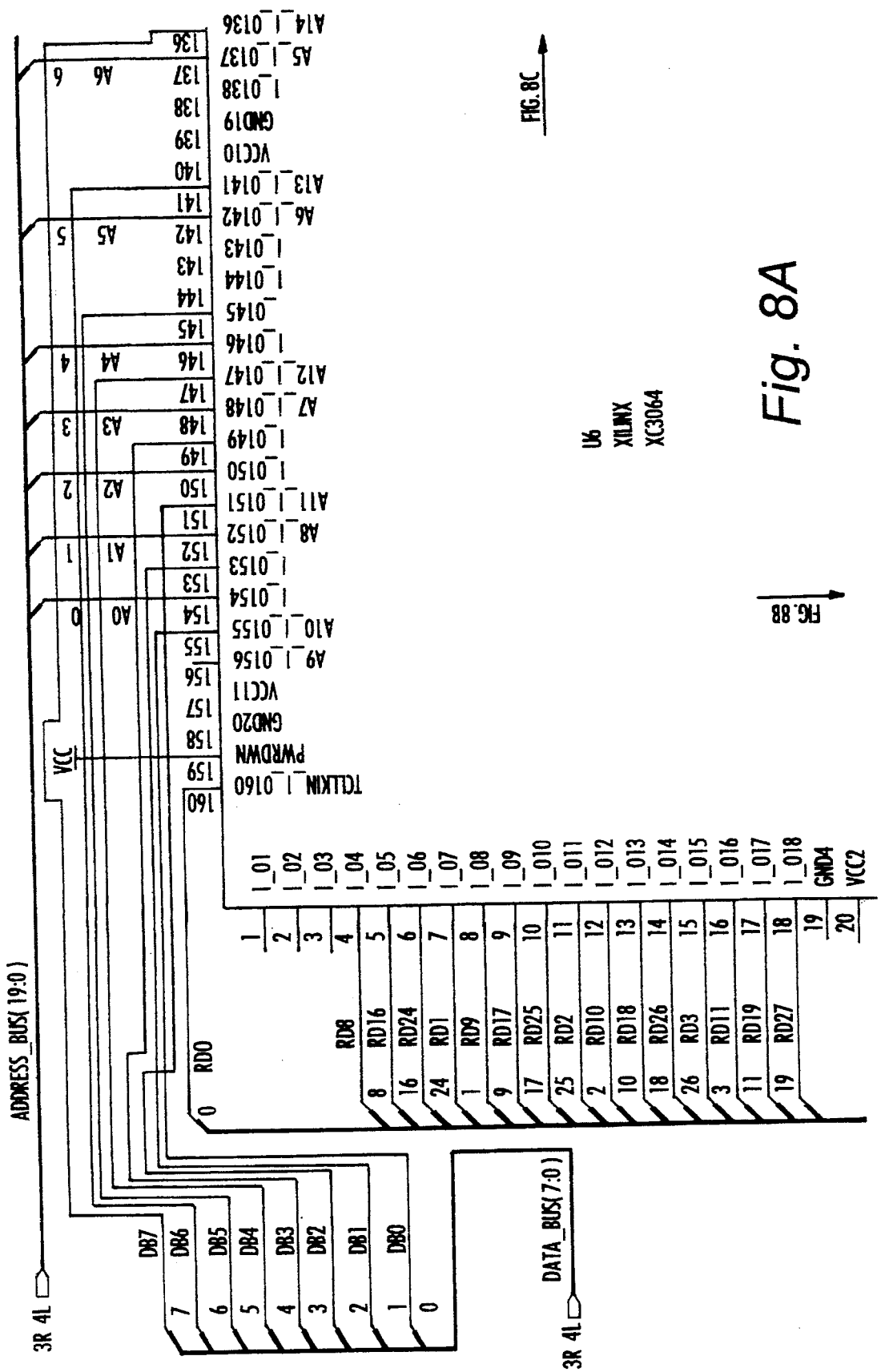
FIG. 8A–D is a schematic diagram showing one embodiment of the ASIC circuitry of the bar code reader/decoder analyzer shown in FIG. 4.
Figure 8B:
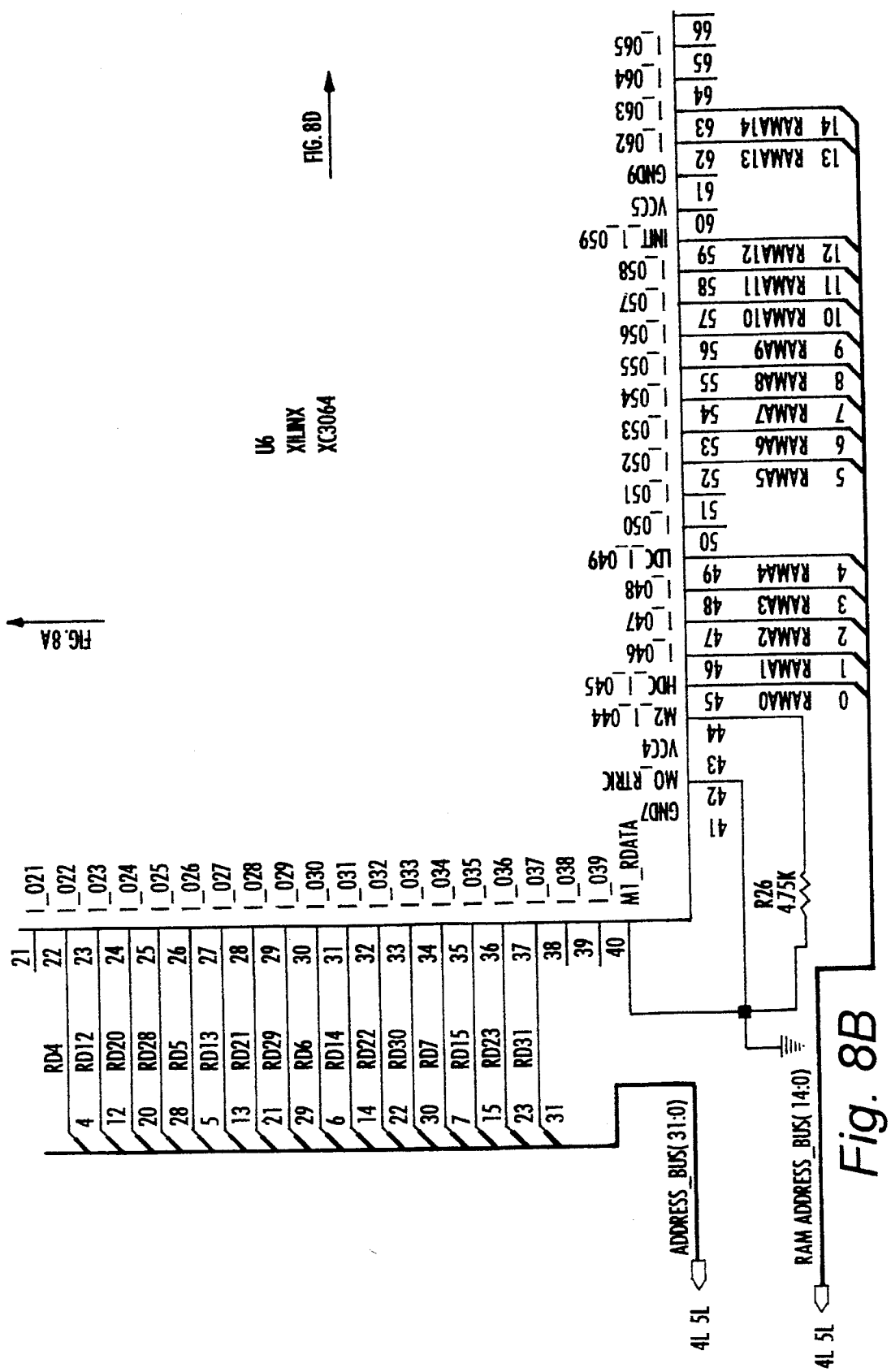
Figure 8C:
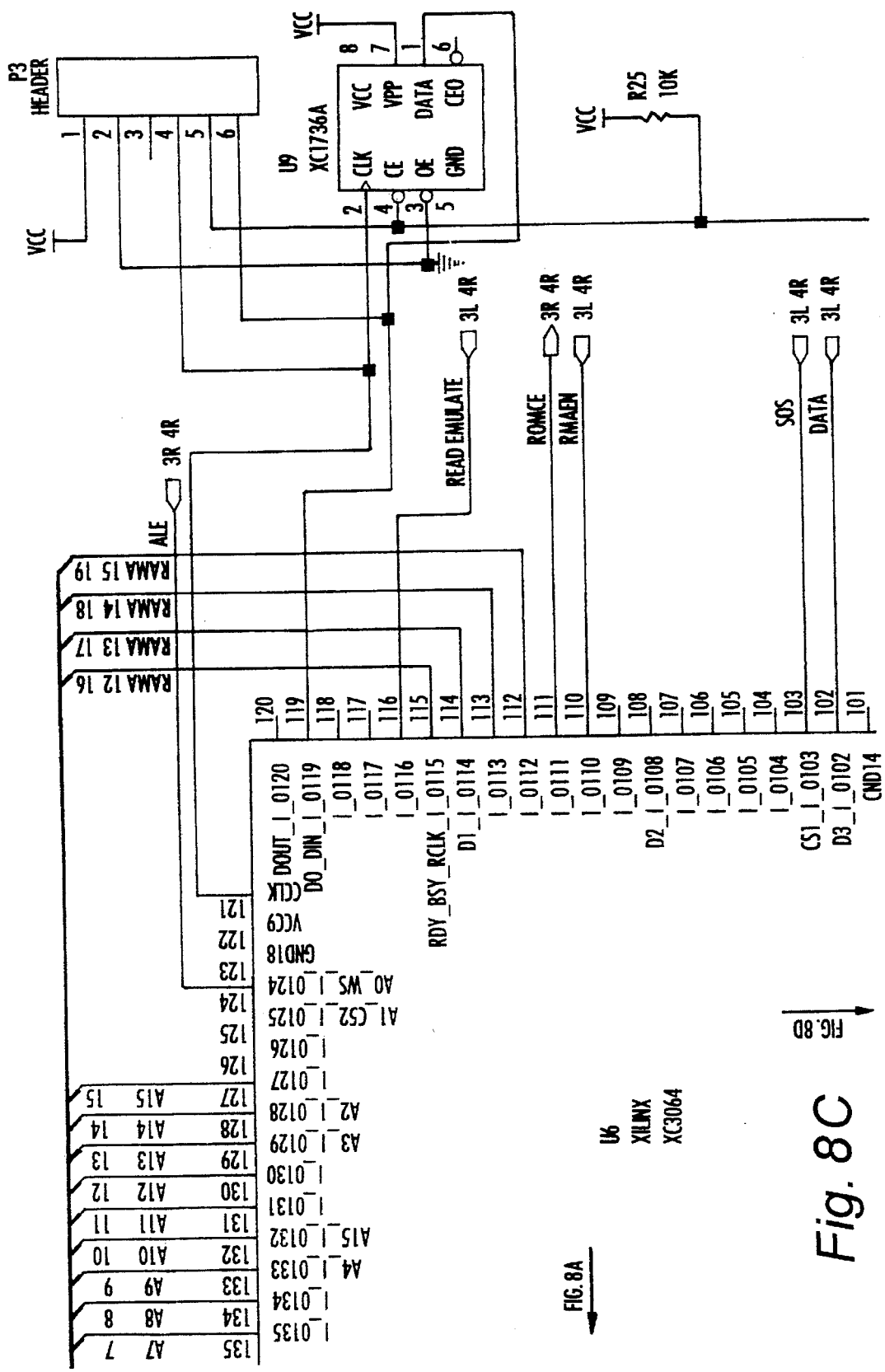
Figure 8D:
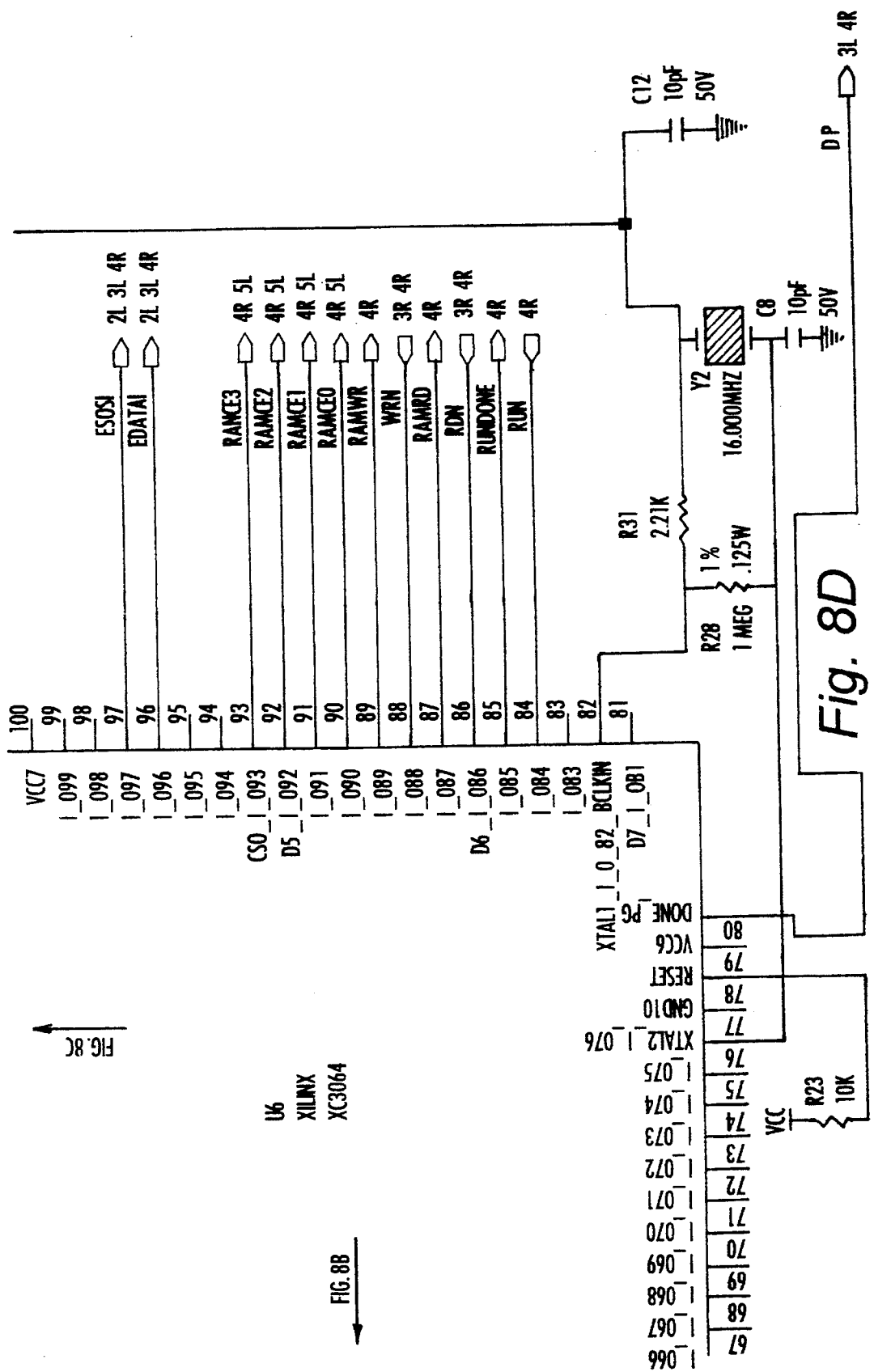
Figure 9B:
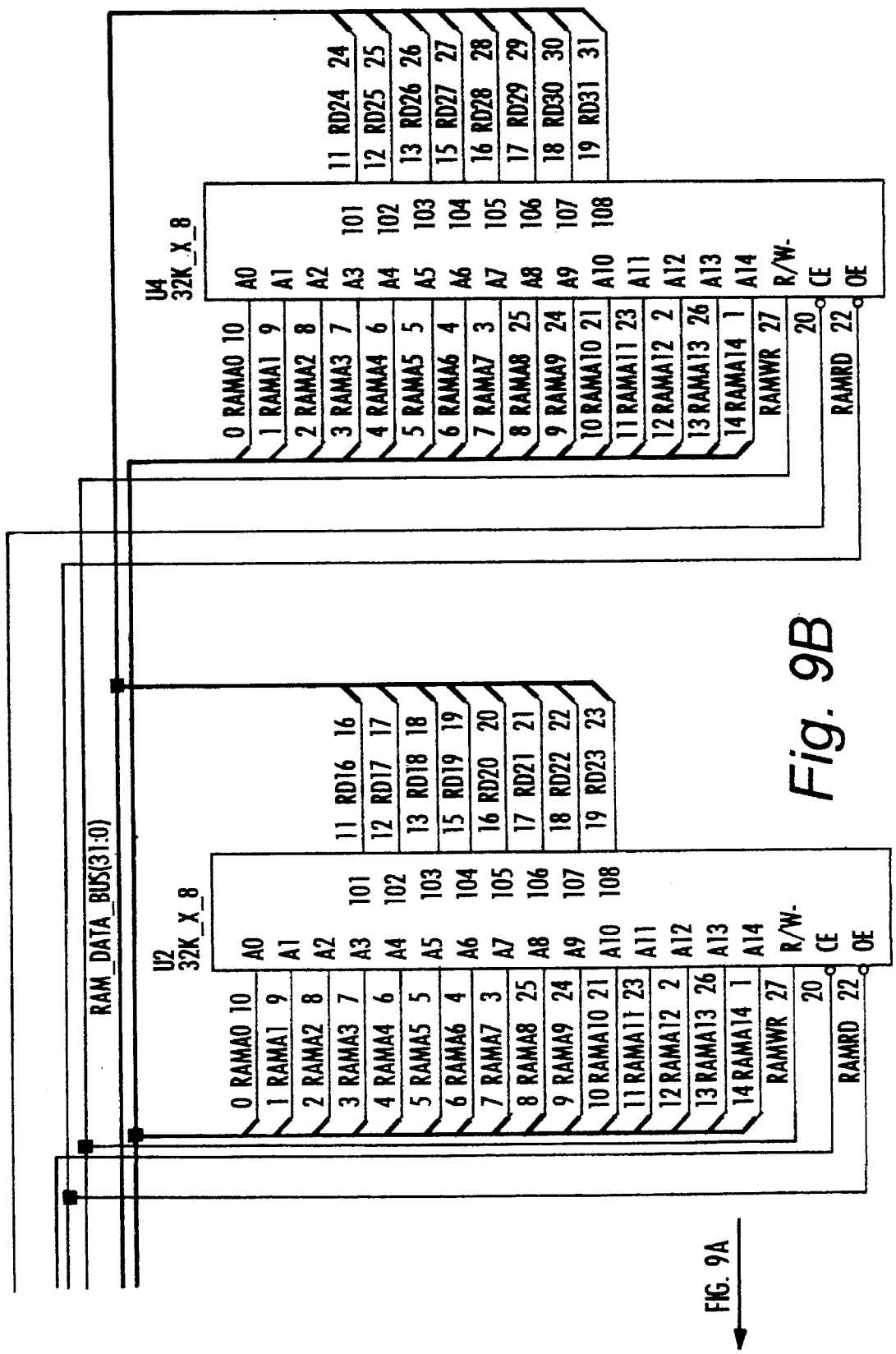

In the emulate mode, the analyzer operates as a bar code emulator for generating from store time interval data located in data store (26) a corresponding test digitized bar code signal which may be supplied to a bar code decoder (18) via decoder interface (23). Series of sets of time interval data can be loaded into the data store (26) from the host computer (11) via the asynchronous port (21) and the control processor (27). The series of sets of time interval data characterize and represent a desired range of digitized bar code signals suitable for evaluation of a given type of bar code decoder. As shown in FIG. 3, the decoded data from the decoding device (18) may be suitably supplied to the host computer (11) for comparison with each respective set of time interval data generated by the system.

Figure 2:
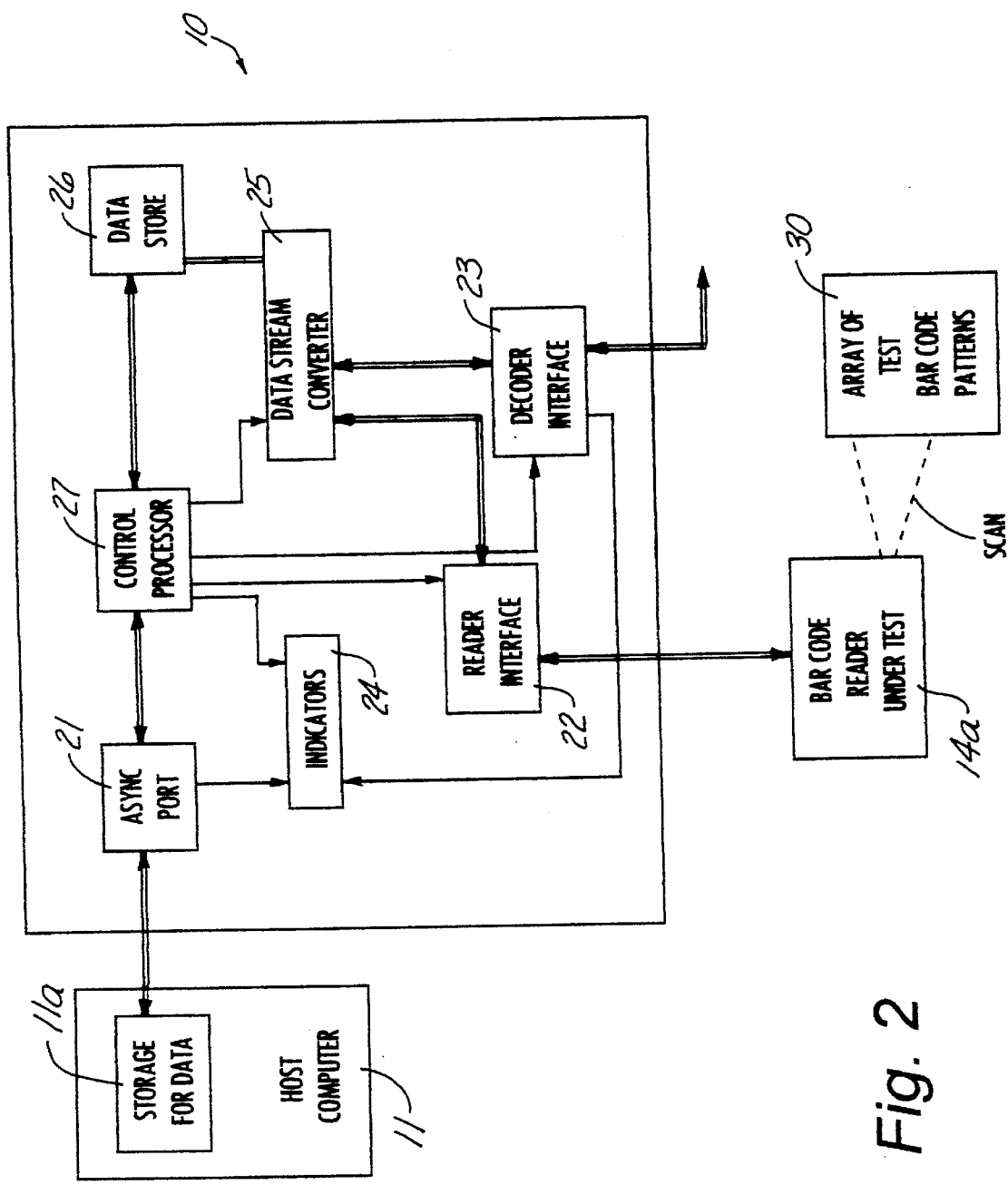
FIG. 2 is a block diagram demonstrating the capture mode of the bar code reader/decoder analyzer system shown in FIG. 1.

FIG. 2 shows the analyzer (10) of FIG. 1 in a CAPTURE mode configuration. In this configuration, a particular bar code reader (14A) under test is connected to the reader interface (22) and is arranged to scan in sequence an array (30) of test bar code patterns selected to efficiently evaluate the bar code reader. For example, if bar code labels are to be printed for a particular application by a specified type of bar code printer, then the array of test labels will represent the range of bar code labels to be expected from the particular printer system in terms of dimensional tolerances, contrast, reading angles, reading range and the like. In selecting a type of scanner for the particular application, a series of bar code readers of different types and of different manufacture may be utilized in sequence to read the respective bar code patterns of the array, the results for each such bar code reader as generated by the analyzer (10) being stored in the host computer (11) as represented at the storage area (11A). While the entire test process may of course be automated, under some circumstances it will be sufficient for a test operator to identify the successive test bar code patterns of the array (30), and then to enter via a keyboard the identity of each specific bar code reader currently under test. The host computer (11) may then be programmed for example to graphically present relevant comparisons in reading effectiveness.

FIG. 3 illustrates the example of FIG. 1 in an EMULATION mode configuration wherein the host computer (11) provides sets of time interval data from a storage indicated at (11B).

The time interval data is transferred into the analyzer (10) where it is converted into a digitized signal by the data stream converter. The digitized signal is then sent to a bar code decoder (18A) to be tested. The decoder (18A) decodes the digitized signal and transmits the decoded information back to the host computer (11). This transfer of decoded information can take place in many ways including manually, back through the analyzer (10) or by direct connection (as shown).

We claim:

1. A bar code reader/decoder analyzer system, comprising:

an analyzer unit having a bar code reader interface means for interfacing with a series of bar code readers of various types to be tested and for receiving digitized bar code signals as a result of scanning by a series of bar code readers under test of an array of bar code patterns selected to test the relative effectiveness of the respective bar code readers of a series;

said analyzer unit having a bar code signal processing means for measuring the time interval between transitions of each of the digitized bar code signals from the interface means;

said analyzer unit having a data output means for transmitting time interval data representing the time intervals measured by the processing means;

a host processor unit interfaced with said data output means for receiving and storing the time interval data obtained by the analyzer unit, said host processor unit storing information with respect to the respective bar code patterns scanned to generate the time interval data so that the time interval data can be analyzed in relation to the respective bar code patterns, thereby to enable evaluation and objective comparison of the respective bar code readers of various types for reading effectiveness;

said host processor unit storing time interval data capable of use to generate a wide range of test digitized bar code signals and being interfaced with said analyzer unit for supplying a wide range of test time interval data corresponding to a wide range of bar code signals suitable for testing the capability of a series of decoders;

said analyzer unit having a digitized signal output means for interfacing with any of a series of various types of decoders and said bar code signal processing means being responsive to sets of test time interval data from the host processor unit to generate a wide range of test digitized bar code signals and to supply the same to said digitized signal output means; and said host processing unit controlling said analyzer unit to supply successive test digitized bar code signals to each decoder, and having decoded data input means for interfacing with a series of various types of decoders so as to store decoded data from such decoders for analysis in relation to the respective corresponding set of test time interval data thereby to enable comparison of respective decoders in relation to the wide range of test digitized bar code signals.

2. The bar code reader/decoder analyzer system of claim 1 wherein the host processor unit is programmed to count the number of bar code scans of each sample bar code pattern and to control the system so that the time interval data from a selected number of bar code scans of a given sample bar code pattern may be stored to account for variation in the scanning relationship between a reader and a sample bar code pattern in successive scans.

3. The bar code reader/decoder analyzer system of claim 1 wherein the emulator unit stores a start of scan value of the start of the scan signal from the reader for each time interval measurement and transmits the start of scan value with the associated time interval measurement to the host processor unit.

4. A system for testing reading and decoding functions of bar code reading devices, comprising:

(a) a host computer unit, including program means for evaluating decoded bar code signals and for generating test bar code signals; and (b) an analyzer unit comprising:

(i) host interface means for enabling communication of digital signals between the analyzer unit and the host computer unit;

(ii) reader interface means for enabling receipt by the analyzer unit of bar code signals read by a reader of a first bar code reading device and transmitted to the analyzer unit from the first bar code reading device;

(iii) decoder interface means for enabling transmission of test bar code signals from the analyzer unit to a decoder of a second bar code reading device; and (iv) control means for selectively decoding the bar code signals received from the first bar code reading device and transmitting the decoded bar code signals to the host computer unit for evaluation, and for selectively receiving test bar code signals from the host computer unit and supplying the test bar code signals received from the host computer unit for transmission to the decoder of the second bar code reading device.

5. The system of claim 4 wherein the host computer unit is a selected one of a plurality of different host computer units, and the host interface means enables communication of digital signals between the analyzer unit and the plurality of different host computer units.

6. The system of claim 4 wherein the reader interface means and the decoder interface means enable communication of bar code signals between selected ones of a plurality of different bar code reading devices, such that the first bar code reading device is a first selected one of the plurality of different bar code reading devices and the second bar code reading device is a second selected one of the plurality of different bar code reading devices.

7. The system of claim 6 wherein the plurality of different bar code reading devices includes laser scanning devices, image scanning devices, and contact wand bar code reading devices.

8. The system of claim 4 further comprising a communication path between the decoder of the second bar code reading device and the host computer unit for transmitting the results of the decoder test to the host computer unit.

9. The system of claim 8 wherein the communication path is implemented through the decoder interface of the analyzer unit.

10. The system of claim 8 wherein the communication path is implemented externally from the analyzer unit.

11. A system for testing decoding functions of a bar code reading device, comprising:

(a) a host computer unit, including program means for generating test bar code signals; and (b) an analyzer unit comprising:

(i) a host interface enabling communication of digital signals between the analyzer unit and the host computer unit;

(ii) a decoder interface enabling transmission of test bar code signals from the analyzer unit to a decoder of the bar code reading device; and (iii) a controller selectively receiving test bar code signals from the host computer unit and supplying the test bar code signals received from the host computer unit for transmission to the decoder of the bar code reading device.

12. The system of claim 11 wherein the host computer unit is a selected one of a plurality of different host computer units, and the host interface means enables communication of digital signals between the analyzer unit and the plurality of different host computer units.

13. The system of claim 11 wherein the decoder interface means enables transmission of test bar code signals to selected ones of a plurality of different bar code reading devices, such that the bar code reading device tested is a selected one of the plurality of different bar code reading devices.

14. The system of claim 13 wherein the plurality of different bar code reading devices includes laser scanning devices, image scanning devices, and contact wand bar code reading devices.

15. The system of claim 11 further comprising a communication path between the decoder of the bar code reading device and the host computer unit for transmitting the results of the decoder test to the host computer unit.

16. The system of claim 15 wherein the communication path is implemented through the decoder interface of the analyzer unit.

17. The system of claim 15 wherein the communication path is implemented externally from the analyzer unit.

* * * * *